SHEARING MACHINE AND METHOD

Original Filed Nov. 24, 1964 7 Sheets-Sheet 1

INVENTORS.
ALBERT F. HAUSMAN
BY AND FELIX A. CHIPLIS
Frank, Jenkins & Hanley
ATTORNEYS.

INVENTORS.
ALBERT F. HAUSMAN
BY AND FELIX A. CHIPLIS
Trask, Jenkins & Hanley
ATTORNEYS.

SHEARING MACHINE AND METHOD

Original Filed Nov. 24, 1964 7 Sheets-Sheet 3

INVENTOR.
ALBERT F. HAUSMAN
BY AND FELIX A. CHIPLIS.
Drash, Jenkins + Hanley
ATTORNEYS.

SHEARING MACHINE AND METHOD

Original Filed Nov. 24, 1964 7 Sheets-Sheet 4

INVENTORS.
ALBERT F. HAUSMAN
BY AND FELIX A. CHIPLIS
Trask, Jenkins & Hanley
ATTORNEYS.

SHEARING MACHINE AND METHOD

Original Filed Nov. 24, 1964 7 Sheets-Sheet 5

INVENTORS.
ALBERT F. HAUSMAN
AND FELIX A. CHIPLIS
BY
Frank, Jenkins & Hanley
ATTORNEYS.

SHEARING MACHINE AND METHOD
Original Filed Nov. 24, 1964 7 Sheets-Sheet 6
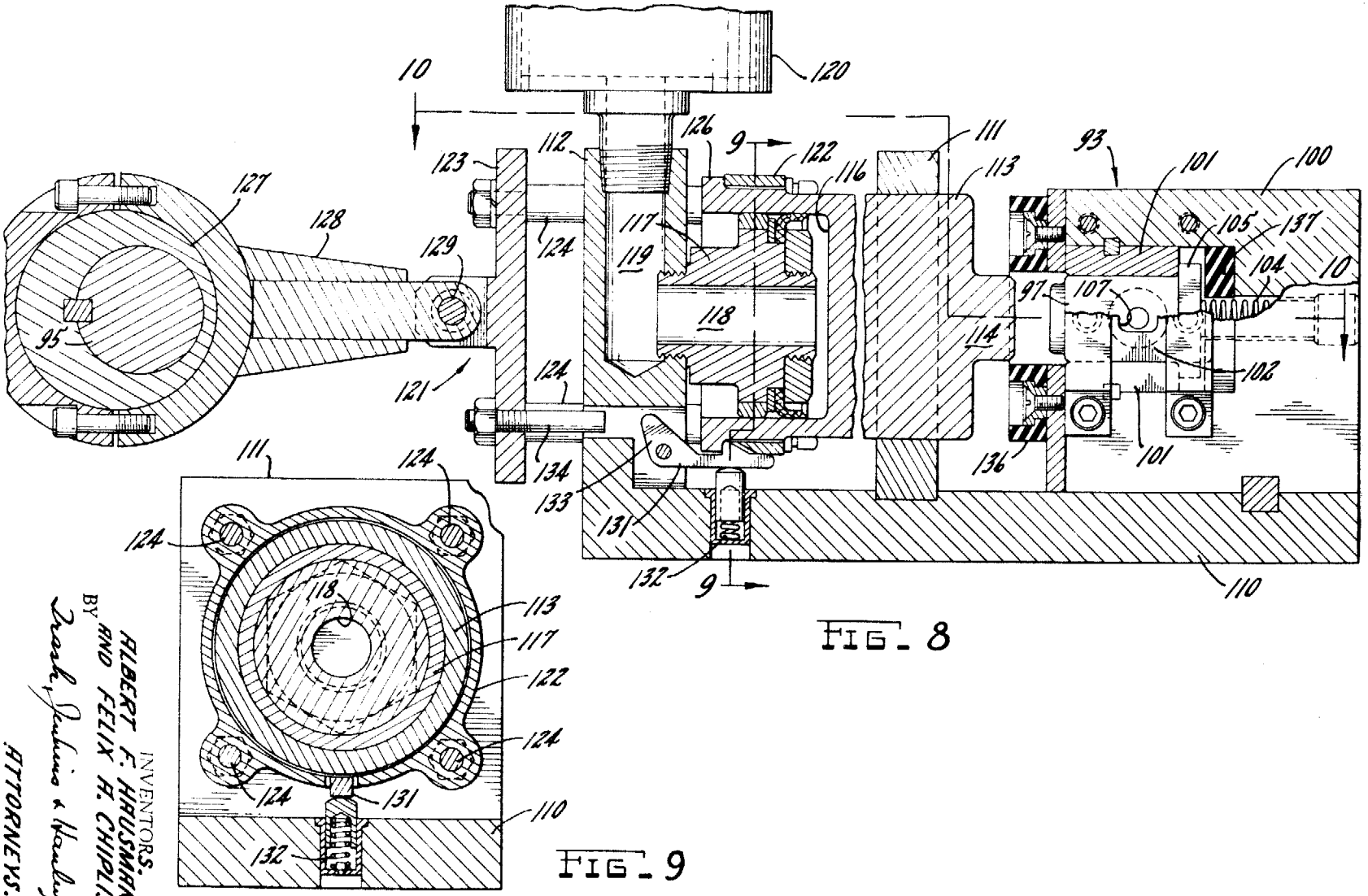
INVENTORS.
ALBERT F. HAUSMAN
AND FELIX A. CHIPLIS
BY
Trask, Jenkins & Hanley
ATTORNEYS.

SHEARING MACHINE AND METHOD

Original Filed Nov. 24, 1964 7 Sheets-Sheet 7

INVENTORS.
ALBERT F. HAUSMAN
AND FELIX A. CHIPLIS
BY
Frank, Jenkins & Harley
ATTORNEYS.

United States Patent Office

Re. 27,043
Reissued Jan. 26, 1971

27,043
SHEARING MACHINE AND METHOD

Albert F. Hausman and Felix A. Chiplis, Indianapolis, Ind., assignors to Amsted Industries Incorporated, Chicago, Ill., a corporation of New Jersey Original No. 3,273,434, dated Sept. 20, 1966, Ser. No. 413,539, Nov. 24, 1964. Application for reissue Sept. 16, 1968, Ser. No. 776,837
Int. Cl. B26d *3/00, 5/12*
U.S. Cl. 83—55 36 Claims

Matter enclosed in heavy brackets [ ] appears in the original patent but forms no part of this reissue specification; matter printed in italics indicates the additions made by reissue.

*ABSTRACT OF THE DISCLOSURE*

*A high-velocity shearing machine for producing straight and true sheared faces. A shearing tool such as a punch or other movable shearing element, mounted for movement in shearing relation with a companion tool such as a die or fixed shearing element, is driven through a shearing stroke by impact of a ram of sufficient mass, accelerated to sufficient velocity, to impart to the movable shearing element a tool velocity of at least 6 to 8 feet per second. Desirably, the ram is driven by fluid pressure in a cylinder. For cyclic operation, the ram may be continuously urged in driving direction by fluid pressure in a large chamber, is mechanically retracted against such pressure, and is then released for acceleration through a working stroke by such pressure. A cushion stops the ram after it has struck the tool and absorbs excess energy. The tool is retracted and work is fed in timed sequence with the ram cycle.*

This is a continuation-in-part of application Serial No. 144,756, filed October 12, 1961, now abandoned, for a Punch Press.

This invention relates to the die shearing of material such as metal, in which the material is stressed in shear to the point of fracture, that is, beyond its ultimate strength, between two cutting edges of die components, which are forced toward each other in passing relation, that is, in the direction of, and on opposite sides of, the plane of shear stress. The invention relates especially to shearing operations in which the character and trueness of the cut face or faces are critically significant.

Operations which use die shearing include, for example, the punching of strip or sheet stock in punch presses to provide holes through the stock, the cutting of blanks from stock in blanking presses, the cutting of pieces from continuous rod or wire, etc.

The most common form of press used for performing operations of the kind mentioned is of the crank type in which a reciprocable member carrying one of the die components, such as the punch of a punch and die set, is connected through a connecting rod to a crank or eccentric on a drive shaft. The motion of the movable die or punch is essentially a harmonic motion in which the velocity of the die or punch is relatively low and decreasing as it approaches the work and moves through its cutting operation. In any given machine, the linear velocity of the movable die as it engages the work and performs its cutting operation will depend upon the speed of the drive shaft; and where the work is automatically fed by mechanism driven from the same drive shaft, the linear speed of the movable die will depend upon the feeding frequency. In such conventional machines, the lineal speeds of the moving punch or other shear die as it approaches and progresses through its shearing operation may be of the order of 1 foot per second and the practical upper limit does not exceed about 2 feet per second.

Another conventional shearing machine, commonly used for cut-off operations, employs a cam to drive the cut-off die. In such machines, the die velocity accelerates from substantially zero at the start of the cutting movement to a maximum near the end of the die cutting movement. In this type of machine also, the practical limit on die velocity, imposed by limitations of operable cam shapes, is of the order of 2 feet per second as a maximum.

As is known, shearing dies used in conventional machines require certain critical clearances, depending on the type of material being cut, its thickness, and its hardness; and with those critical operating clearances, the dies produce certain [characteristics] *characteristic* results at the cut edges. As the shearing action of the dies begins, the stock undergoes plastic deformation which produces a rounded edge, or edge radius, bordering the contact area of each die on the face of the material. As die movement continues, the die edges penetrate and cut the material, which produces a substantially straight cut band on the cut face. The penetration reduces the cross-section of stock remaining between the dies, and as penetration increases, fracture occurs through the remaining stock cross-section, and this produces a cleavage surface which is usually irregular and rough and which lies at an angle to the direction of die movement. The edge radius, the cut band, and the angled cleavage surface appear on both edge faces produced by the shearing. In a punched hole, the plastic deformation produces a substantial edge radius at the punch-entrance end of the hole, the penetration produces a narrow substantially cylindrical cut band, and the fracture produces a frustoconical cleavage surface which flares outward from the cut band to the opposite face of the stock. If a substantially cylindrical hole is desired, it is necessary with conventional operations first to punch a hole having these non-cylindrical wall portions, and then to shave the hole to the desired cylindrical configuration and size in a separate secondary operation. Similar secondary operations are necessary on other conventionally sheared parts if it is desired to produce true faces at right angles to the work-piece surface.

In accordance with the present invention, it has been found that greatly improved results can be obtained, especially in certain types of work, by performing the cutting operation at linear speeds well above those practicably attainable in conventional machines. With such high speeds, clearances can be reduced well below the critical ranges required with conventional operation of corresponding dies on corresponding stock. With the higher speeds and narrower clearances, greatly improved and truer edge faces are produced by the shearing, to a degree which often permits secondary shearing operations and other truing operations to be eliminated. In hole piercing operations, for example, at linear punching speeds in accordance with the present invention, the tendency of the cleavage surface to flare is greatly reduced and is less dependent on the nature of the metal being pierced. In fact, without producing punch and die wear at a rate which would render the operation impractical, it is possible with high punching speeds, by appropriate selection of relative punch and die-hole diameters, to produce pierced holes having an essentially uniform diameter through the entire thickness of the metal, or even holes which are smaller on the die side of the metal than on the punch side. Moreover, the trueness and smoothness of the surfaces of the holes is comparable to or better than that produced by the conventional combination of piercing and shaving operations. The improvements tend to reduce or eliminate difficulties arising from the nature of the metal, which gives the manufacturer greater freedom of choice of materials and permits use of less expensive or otherwise more desirable grades or types of material which would not be practical to use with conventional cutting operations.

In the case of blanking and simple shearing, the high die shearing speeds promote smoothness and increase trueness of the edge faces of the blanks. In cut-off operations, such as in shearing pieces from rod or other continuous lengths of stock, the high speed shearing operations will produce substantially undistorted square and flat ends where prior shearing produced distorted ends and rough and angular end faces.

In carrying out our invention we drive the movable cutting tool, or a set of cutting tools, through the working stroke by a relatively massive ram accelerated to a velocity of at least several hundred feed per minute. Conveniently, the tools are separate from the ram and are driven by impact of the ram after it has been accelerated to the high velocity. While it is tool velocity which acts on the work, it is convenient to measure and refer to ram velocity. Tool velocity is at least equivalent to ram velocity. The lineal velocity to which the ram should be accelerated in any particular case will vary with the character and section of the stock material. The mass and velocity of the ram must of course provide sufficient energy to shear and fracture the material being worked on, and excess energy should be held within reasonable limits since it must be absorbed by the machine without performing useful work. In general, the minimum lineal tool velocities which are practical in accordance with the invention are velocities of at least 6 to 8 feet per second, with the lower velocities generally applicable to punching operations and with higher minimum velocities desirable for cut-off operations. Desirably, velocities higher than the minimums are used, and we preferably use velocities of at least 10 to 12 feet per second. The velocities used may be substantially higher than these minimums, with improved results, and we have used velocities of the order of 50 feet per second in cut-off operations. While the shearing operation itself appears to impose no top limit on the velocity used, practical considerations require that the velocity not exceed the limitations of the mechanical design and strength of the die components and the machine structure.

Preferably, the ram is accelerated by subjecting it to force derived from a confined body of air or other gas maintained under elevated pressure. In a cyclically operating machine, the ram is retracted with accompanying compression of the gas by power-operated means and, after retraction, is abruptly released to permit it to accelerate and acquire sufficient momentum to force the cutting tool through the work at high velocity. Desirably, the change in volume of the confined gas which accompanies retraction and advance of the ram is small relative to the total volume of the gas, in order that the ram-accelerating force exerted by the gas will not decrease unduly as the ram advances.

In a preferred form of machine embodying the invention, a portion of the confined gas is contained in a cylinder within which a piston is disposed. Either the piston or the cylinder is stationary, while the other of those elements is operatively connected to the ram. Where the piston is the stationary element, the ram and cylinder may conveniently be integral with each other. Means for retracting and releasing the ram may take various forms such, for example, as a rotating, spiral cam having a ram-retracting lobe which terminates abruptly. Another suitable form of such a means comprises a crank-reciprocated ram-retractor and a latch which retains the ram in retracted position while the retractor advances toward the work and is then abruptly released. The working stroke of the ram is limited by a stop positioned to be engaged by the ram after it has struck the cutting tool and forced it through the cutting stroke, and to [pervent] *prevent* substantial over-travel. Retraction of the cutting tool after performance of its cutting stroke may in some instances be effected by a spring; while in other instances it may be desirable to effect its retraction by power-operated means operating in timed relation with the ram-retracting means. [Perferably,] *Preferably,* the work-piece is held against the stationary die component during the shearing operation, as by a stripper plate or other hold-down device, under high pressure.

Other objects and features of the invention will appear from the following more detailed description and from the accompanying drawings, in which:

FIG. 8 is a vertical, axial section through the shearing mechanism of the machine illustrated in FIG. 7, taken on the line 8—8 of FIG. 7, showing the ram and cutting tool in their retracted positions;

FIG. 9 is a vertical section on the line 9—9 of FIG. 8;

Figure 1:
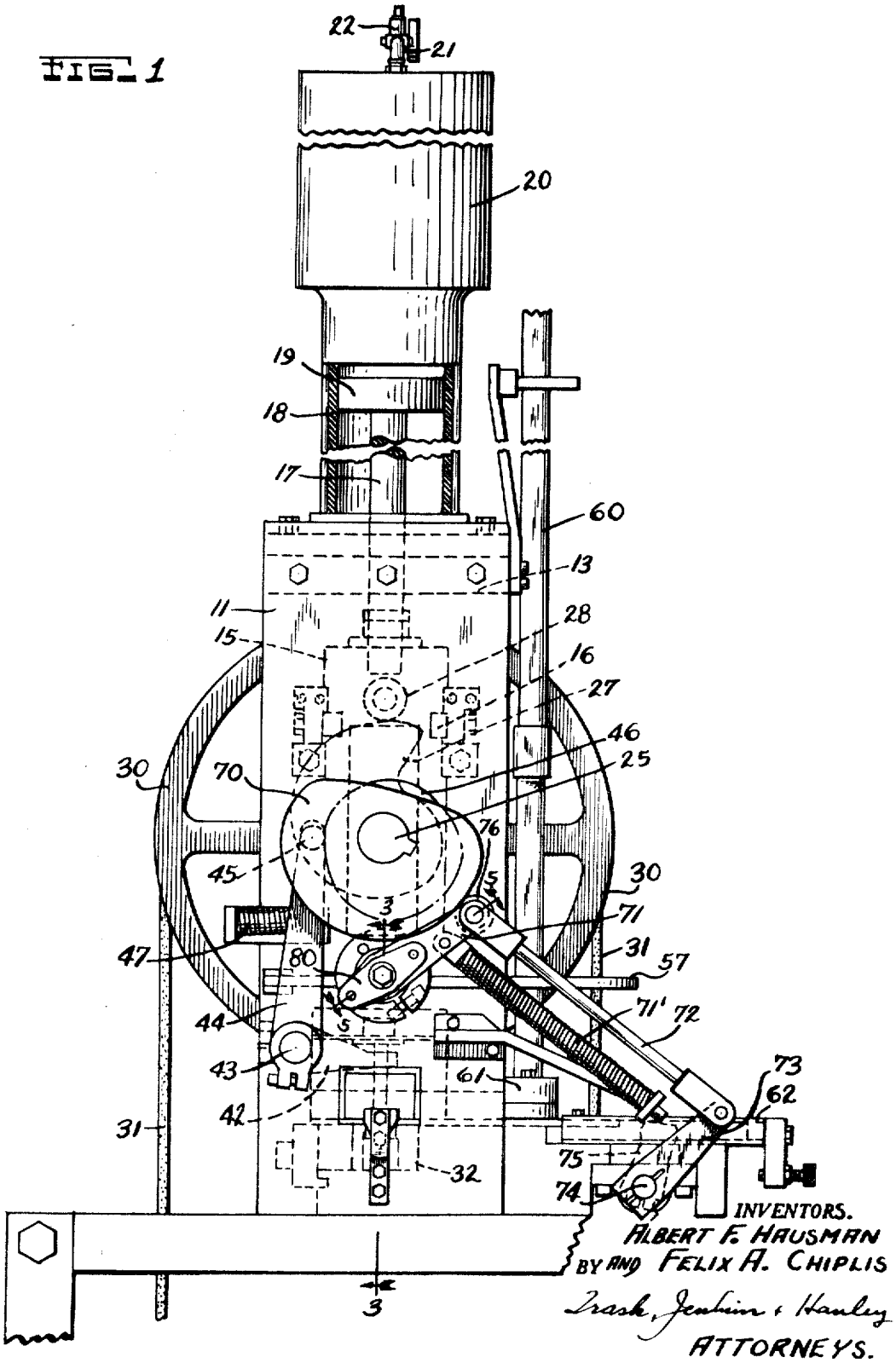
FIG. 1 is a side elevation of a punch press embodying the invention and adapted to punch holes in successively fed, discrete blanks.
Figure 2:
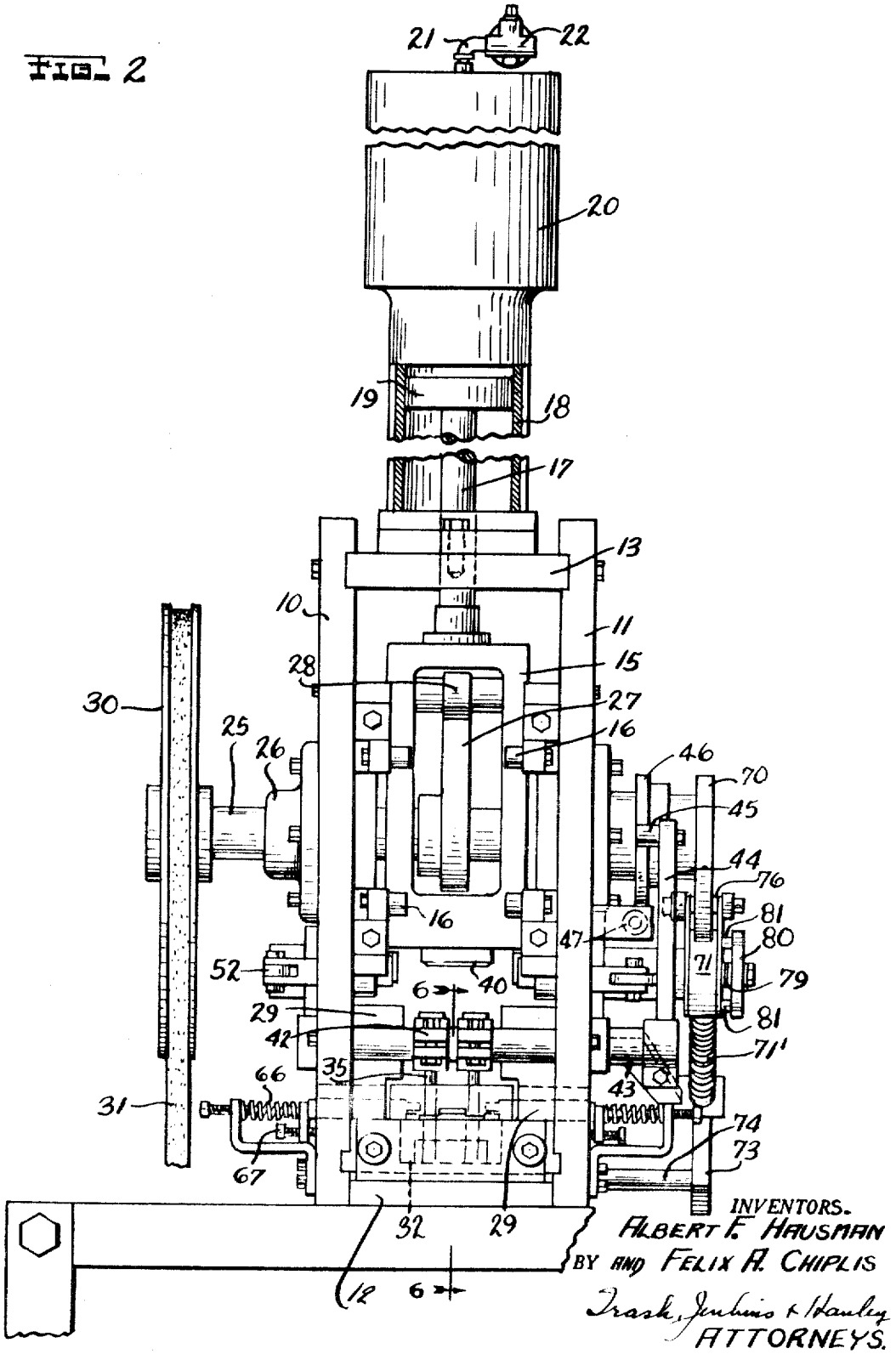
FIG. 2 is a rear elevation of the punch press of FIG. 1.
Figure 3:
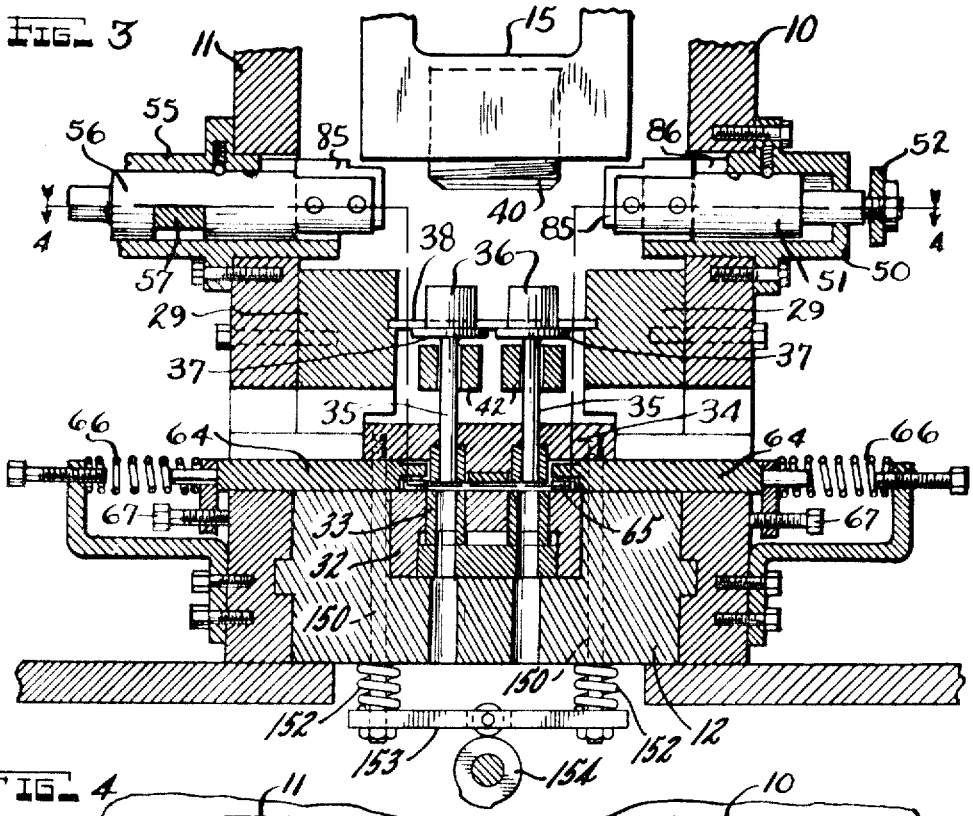
FIG. 3 is a vertical section through the bottom portion of the press on the line 3—3 of FIG. 1.
Figure 4:
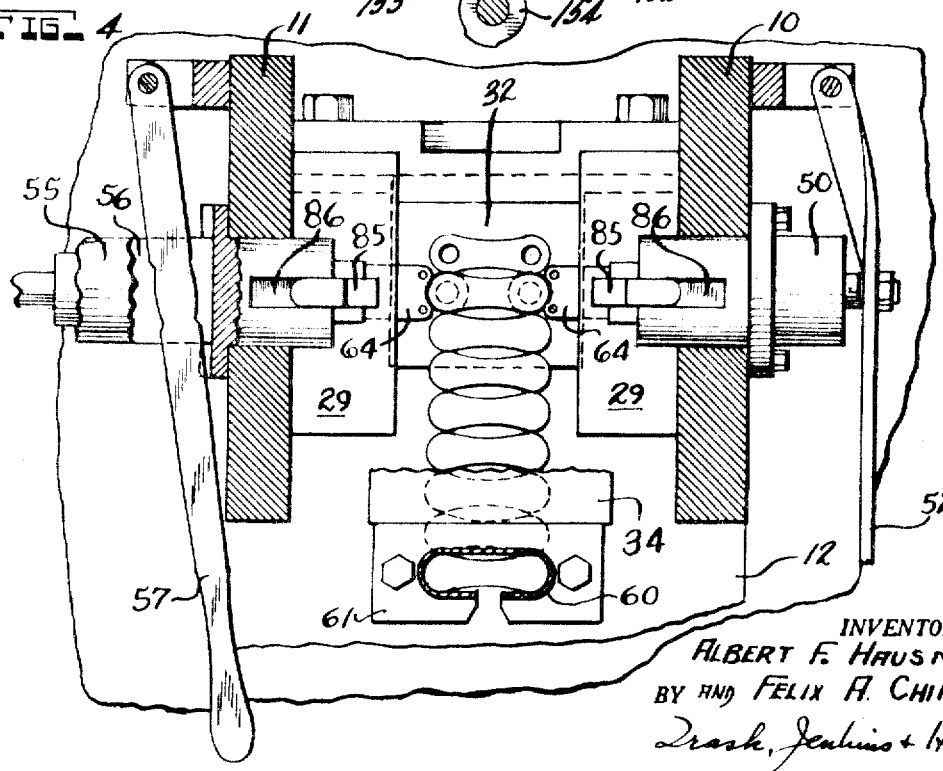
FIG. 4 is a horizontal section on the line 4—4 of FIG. 3.

The punch press illustrated in FIGS. 1–6 embodies a frame comprising vertical, parallel side plates 10 and 11 secured at their lower ends to a base 12 and at their upper ends to a top plate 13. Between the side plates, a hammer or ram 15 is mounted for vertical reciprocation. Conveniently, the ram 15 is a rectangular parallelapiped of metal the center portion of which is cut out to provide a vertically elongated opening extending through the ram from front to back. Guide rollers 16 supported in any convenient manner from the frame engage the sides, the front, and the back of the ram to guide it in its vertical reciprocation.

Connected to the top of the ram 15 is a piston rod 17 which extends upwardly through the top plate 13 and projects into the open lower end of a cylinder 18, where it is provided with a piston 19. Desirably, the upper end of the cylinder 18 is enlarged to provide an accumulator 20 adapted to contain a considerable volume of air or other gas under pressure. The supply of air or other gas under pressure in the cylinder and accumulator is maintained through a pipe 21 containing a suitable pressure-regulating valve 22.

For the purpose of raising the ram 15 against the fluid pressure in the cylinder 18, we provide a main shaft 25 which is rotatably supported in suitable bearings 26 from the side plates 10 and 11 and which extends through vertical slots in the sides of the ram 15, such slots being long enough to permit the desired vertical movement of the ram. Between the sides of the ram, there is secured to the shaft 25 a spiral cam 27 which engages a cam-following roller 28 mounted in the ram. The cam 27 is shaped so that as the shaft 25 rotates, in a counter-clockwise direction as shown in FIG. 1, the cam will gradually raise the ram 15 and piston 19 against the pressure in the cylinder and accumulator and then abruptly move out of engagement with the roller 28 to permit the ram to descend rapidly under the fluid pressure exerted on the piston 19. Desirably, descent of the ram is limited by ram-stops 29 supported on the base 12 in position to be engaged by the descending ram before the roller 28 can impinge on the low point of the cam 27. The shaft 25 projects outwardly beyond the bearing 26 on the side plate 10 and is provided with a pulley 30 driven through a belt 31 from any convenient source of power.

The arrangement of punch and die mechanism embodied in the machine will of course depend upon the nature of the work the press is to perform. The punch press shown in FIGS. 1–6 is designed for perforating small, automatically fed blanks, specifically, for providing the pitch holes in the link plates P of a power-transmission chain. In the arrangement shown, the base 12 is recessed for the reception of a die pad 32 containing die bushings 33. A hold-down and stripper plate 34 carried by guide rods 150 is normally urged downward to hold the link plates P against the face of the die pad 32 and bushings 33, by springs 152 acting on a cross-head 153 carried by the lower ends of the guide rods. The pressure on the plates P is desirably about 1200 lbs. per square inch. A cam 154 driven in timed relation with the feed mechanism, described below, lifts the plate 34 slightly during feed movement of the link plates. The plate 34 slidably receives and guides punches 35 respectively aligned with the holes in the die bushings. Well above the stripper 34 the punches 35 are provided with enlarged heads 36 having at their lower ends still larger flanges 37. Upward movement of the punches in the stripper 34 is limited by a stop plate 38 supported from the ram stops 29 and provided with openings large enough to pass the heads 36 but too small to pass the head-flanges 37. Desirably, the bottom of the ram 15 is provided with a punch-engaging member 40 which is vertically adjustable in the ram to vary the extent to which the punches 35 are forced downwardly when the ram descends. As shown, the member 400 is a plug, screw threaded into the bottom of the ram.

To raise the punches 35 after each descent of the ram, the punches are loosely received (FIG. 6) below their flanges 37 in openings in the ends of lifting arms 42 secured to a rock-shaft 43 rotatably supported from the side plates 10 and 11. The shaft 43 projects outwardly beyond the side plate 11 where (FIG. 1) there is secured to it an arm 44 projecting upwardly and carrying at its upper end a follower 45 engaged by a cam 46 secured to the main shaft 25. A spring 47 acting on the arm 44 may be employed to maintain the cam follower 45 in engagement with the cam 46. The cam 46 is so shaped and so oriented on the shaft 25 that promptly after the cam 27 has moved out of engagement with the cam follower 28 and the ram 15 has descended the cam 46 will rock the shaft 43 in a direction to cause the arms 42 to raise the punches 35, to hold the punches elevated while the pierced blank is removed and a new blank substituted, and then to lower the arms 42 so that they will not interfere with downward movement of the punches when the ram 15 again descends.

To permit ready access to the punches and the die, it is desirable to provide the machine with means for retaining the ram 15 elevated independently of the position of the cam 27. For this purpose the machine shown in FIGS. 1–6 embodies two independently operable latches, mounted respectively on the side plates 10 and 11. The latch on the side plate 10 comprises (FIG. 3) a cup-like guide 50 mounted in a hole in the side plate 10 and adapted to receive a latch member 51 slidable in the guide between positions in which it lies respectively within and laterally beyond the path of the descending ram 15. The latch 51 has a shank which projects outwardly beyond the guide 50 for operative connection to a lever 52 fulcrumed to the side plate 10 near the rear edge thereof.

The other latch mechanism, that carried by the side plate 11, is associated with feeding mechanism to be described below. Such other latch mechanism comprising a cup-like guide 55 mounted in a hole in the side plate 11 and arranged to receive a slidable latch member 56 which, like the latch member 51, can be projected into the path of the ram 15. As will be clear from FIGS. 3 and 4, the latch member 56 is provided inside the guide 55 with a notch receiving the intermediate portion of an operating lever 57, which extends through slots in the front and back of the guide 55, and is fulcrumed at its rear end to the side plate 11.

As previously indicated, the machine shown in FIGS. 1–6 is intended for use in piercing the link plates of power transmission chain. A supply of such plates to be pierced is contained in tubular magazine 60 supported vertically at the front of the machine with its lower end received in a socket 61 which has an opening permitting the plates in the magazine, while still stacked in superposed relation, to pass downwardly through the socket until the lowermost plate rests on the upper surface of the base 12, as will be clear from FIG. 6. The rear of the socket 61 is provided with a notch leading to a guide groove through which the plates to be pierced may be advanced from the socket 61 into piercing position over the dies 32. For the purpose of so advancing the link plates successively, we provide feed mechanism embodying a feed slide 62 mounted for fore-and-aft reciprocating in the front portion of the base 12. To the inner end of the slide 62 there is secured a feed tongue 63 which rests on the upper surface of the base 12 and which has a thickness slightly less than the link plates to be pierced. In rearward movement of the slide 62 from the position shown in FIG. 6, the tongue 63 engages the lowermost link plate in the stack contained in the magazine 60 and socket 61 and advances such plate toward piercing position. As each plate is advanced, it forces ahead of [its] *it* plates previously fed, as will be clear from FIG. 4. At the piercing position, locating jaws 64 slidably mounted in the stripper 34 and the ram stops 29 engage the ends of the link plate and retain it in proper position during the piercing operation. As shown, each of the locating jaws 64 is provided at its inner end with a pair of spaced rollers 65 which receive between them the rounded end of the link plate. The jaws 64 are spring-pressed inwardly by spring 66 toward positions determined by adjustable stop screws 67. As each link plate approaches piercing position its rounded ends engage the forward rollers 65 on the locating jaws 64 and force them outwardly to permit the link plate to move over the dies 33, whereupon the springs 66 force the jaws inwardly causing the rollers to grip the link plate and hold it in proper position for piercing.

For the purpose of reciprocating the feed slide 62 we employ a feed cam 70 rigidly secured to the drive shaft 25. The cam 70 serves to oscillate a pivotally mounted arm 71 connected through a link 72 to an arm 73 rigidly secured to a rock-shaft 74 that extends transversely of the machine below the feed slide 62. Such slide is provided with a slot which receives the end of a second arm 75 rigidly secured to the shaft 74. A spring 71' acts on the arm 71 to maintain a cam following roller 76 on the arm in contact with the cam 70.

The cam 70 is so shaped and so oriented with respect to the cams 27 and 46 that it retains the feed slide 62 in retracted position against the force of the spring 71' until after the ram 15 has begun its upward movement and the fingers 42 have raised the punches to clear the plate just pierced so that such plate will be free to move when the feed slide does advance. For a reason which will become apparent hereinafter, the cam 70 places the feed slide in retracted position preferably before the cam reaches the top of its stroke and in any event before the cam, in descending, reaches a position where it would obstruct inward movement of the latch member 56.

Conveniently, the arm 71 is associated with the latch member 56 in such a way that when the latch member is advanced to retain the ram 15 in elevated position the feed mechanism will be rendered inoperative. For this purpose, the guide 55 for the slide 56 is formed at its outer end with a boss 78 on which the arm 71 is pivoted for oscillatory movement. The latch member 56 has a shank 79 which projects through such boss and rotatably supports at its outer end a cross piece 80 from which a pair of parallel pins 81 project inwardly parallel to and on opposite sides of the shank 79 for slidable reception in holes in the arm 71. Inwardly from the arm 71 there is mounted on the guide 55 a stationary plate 82 having holes 83 with which the pins 81 come into alignment as the feed slide 62 reaches the outer limit of its reciprocation.

Figure 5:
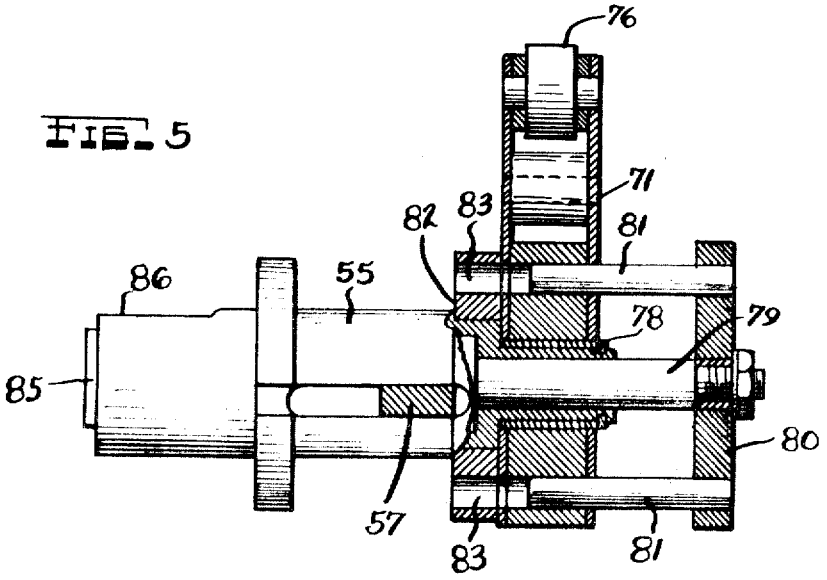
FIG. 5 is a detail view in partial section on the line 5—5 of FIG. 1.
Figure 6:
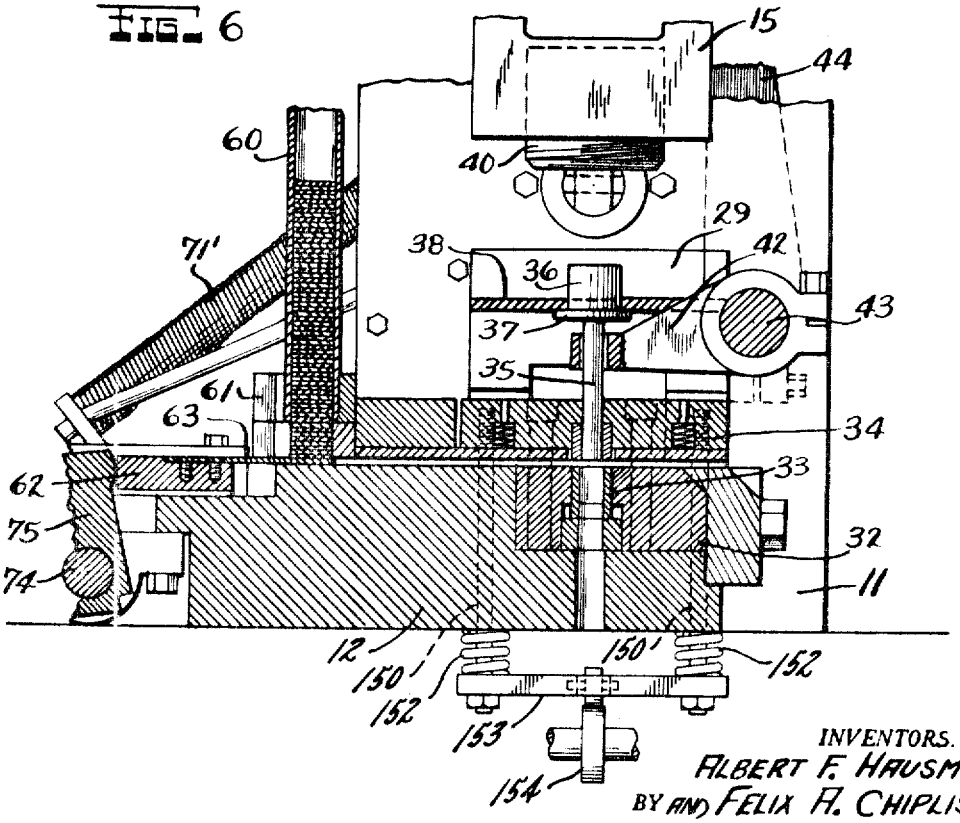
FIG. 6 is a fragmental vertical section on the line 6—6 of FIG. 2.

In the normal, or retracted, position of the latch 56 the pins 81 lie within the arm 71 in the position shown in FIG. 5 and do not project into the holes 83 of the stationary plate 82. Accordingly the arm 71 is free to oscillate on the boss 78, carrying with it the pins 81 and the cross-piece 80. If it is desired to interrupt both reciprocation of the ram 15 and operation of the feeding mechanism, the lever 57 is urged inwardly, or to the right of FIG. 4. Unless the ram is at or near the top of its stroke, such inward urging of the lever 57 can do no more than force the inner end of the latch member 56 against the side of the ram; but if the effort on the lever 57 is maintained, the ram will clear the inner end of the lattch member 56 as it reaches the top of its stroke, and the latch member can be moved into fully advanced position where it will prevent descent of the ram. As the inner end of the latch member 56 moves into the path of the ram 15, the pins 81 which were positioned in alignment with the holes 83 in the stationary plate 82 when the feed side 62 reached retracted position will enter such holes and thus retain the feed slide in retracted position as the land of the cam 70, in continuing rotation of the shaft 25, moves out of engagement with the cam follower 76.

If it is desired to interrupt reciprocation of the ram 15 while still leaving the feeding mechanism in operation, the operator will advance the latch member 51 instead of the latch member 56. This operation is effected by applying an inward effort to the operating lever to cause the latch member 51 to move beneath the ram 15 as the latter reaches the upper end of its stroke. Desirably, the clearance beneath the latch members 51 and 56 and the lower face of the ram 15 when such ram is at the top of its stroke is made as small as practicable in order that the descending ram will not attain an unduly high velocity before it impinges on one or the other or both of the latch members. If desired, the latch members may be provided with hardened nose pieces 85 to receive the impact of the descending ram, and such nose pieces may project laterally from the latch members to be received in slots 86 in the guides 50 and 55, thus preventing rotation of the latch members in the guides.

The operation of the machine illustrated should be evident from the above description, but it may be summarized as follows: With a stack of link plates in the magazine 60, with the latch members 51 and 56 retracted, and with the drive shaft 25 rotating in a counter-clockwise direction (FIG. 1), the cam 27 will alternately raise the ram 15 and permit it to descend under the influence of gravity and the fluid pressure existing within the cylinder-accumulator 18–20. As the ram 15 approaches the lower limit of its stroke, it first strikes the heads of the punches 35 to effect the piercing operation and then engages the stops 29, which limit its further descent. Desirably, the stops 29 are so positioned that the ram will engage them before the roller 28 on the ram can come into contact with the cam 27. As the cam 27, in its continuing rotation, engages the roller 28 and begins to raise the ram, the cam 46 operates to lift the fingers 42 and restore the punches to raised position. Promptly thereafter the feed slide 62, which was in retracted position when the ram began its descent, advances to feed a link plate from the magazine and to cause ejection of the plate just pierced.

Immediately following the advance of the feed slide 62, the cam 70 operates to move it into retracted position before the ram begins its next descent. At any time while the machine is in operation, the lever 57 can be operated to advance the latch member 56 and retain the ram in elevated position and simultaneously to lock the arm 71 in a position which will retain the feed-slide 62 retracted. If it should be desired to interrupt reciprocation of the ram while permitting the feeding mechanism to remain in operation the latch member 51 instead of the latch member 56 can be advanced to retain the ram in elevated position.

It will be understood that the proportions of the machine will depend upon the effort required to effect the piercing operation. A machine which we have employed to punch pitch holes 0.273 inch in diameter in soft steel link-plates 0.080 inch in thickness has the following specifications:

| | | |
|---|---|---|
| Weight of ram, piston rod and piston | lbs. | 18 |
| Stroke of ram | inches | 1½ |
| Piston diameter | do | 3 |
| Volume of cylinder-accumulator (approx.) | cu. in. | 200 |
| Pressure in cylinder-accumulator | p.s.i. | 50 |
| Stroke frequency | per min. | 300 |

In such a machine, and with the air pressure specified, the ram will attain a velocity of 700 to 800 feet per minute—11 to 13 feet per second—before striking the punches and driving them downwardly to perform the punching operation. Since the piston displacement is only about 5% of the total volume of the cylinder-accumulator, the pressure acting on the piston 19 will not change significantly as the piston moves and will therefore continue to exert its ram-accelerating effect throughout the entire down-stroke of the ram. The ram-accelerating pressure is independent of the stroke frequency, which can be as high or higher than with conventional presses, and can be varied to suit the stock feed rate without affecting the shearing conditions.

Shearing velocity can be changed by varying the ram weight or stroke or, in a particular set-up, by adjusting the air pressure. A series of experimental operations were run on the machine described above, using different ram velocities and different die clearances, with the following results.

In general, the holes produced in the link plates had smoother walls and less taper than those produced by conventional punching equipment, and it was readily possible to produce holes which were substantially free from taper and had smooth walls comparable to or even better than those produced by conventional punching followed by a secondary shaving operation which removes a few thousandths of an inch of metal from the wall of the pierced hole.

Substantially narrower clearances could be used between the high velocity punch and its die than are required on conventional presses piercing corresponding holes in corresponding material. For example, conventional die clearances on the link plate material used are of the order of 6% of the stock thickness, or about .005" each side, for .080" stock. We operated the high velocity machine satisfactorily with clearances of the order of .001" on each side or .002 on the diameter. Both clearance width and ram velocity affects hole shape and size. In link plates punched experimentally on the above machine, an increase in punch velocity from 358 to 690 feet per minute increased hole diameter from .2740 to .2745 inch with the same tools. A punch and die clearance of .0055" on the diameter produced holes which were larger on the punch exit side, .0024" clearance on the diameter produced straight holes, and .0014" clearance on the diameter produced holes larger on the punch entrance side—that is with the taper reversed from that which occurs with conventional punching.

The link plates being punched were of the type used in power transmission chain, in which the load is transmitted from link to link by the bearing contact between the hole walls of the link plates and the pins received in such holes. It will be understood that the smoothness and straightness of the hole walls have a critical influence on the area and character of the bearing surface available to transmit the load.

In addition to providing smoother and more nearly cylindrical holes, a punch press employing our invention has other substantial advantages. For example, a press having the specifications set forth above is capable of performing punching operations which would require a 13-ton punch press of conventional type. The machine is therefore much lighter in weight and occupies considerably less floor space. Further, since the downward effort applied to the ram is directed parallel to the path over which the ram reciprocates, the ram-guiding means is not subjected to the side loads and wear which result from inclination of the connecting rod or link in presses of the conventional type.

The shearing machine shown in FIGS. 7–11 is one adapted to cut pins of predetermined length from intermittently fed stock 90 in the form of a rod or wire. The stock-feeding means, which is of known type, comprises a stationary stock-clamp 91 and a second clamp 92 which reciprocates over a path parallel to the stock 90. During the forward or feeding stroke of the clamp 92 such clamp is closed to grip the stock, while the clamp 91 is released, with the result that the sock is fed forwardly into a shear 93. During the reverse stroke of the clamp 92, it is released while the clamp 91 is closed to hold the stock in fixed position as the shear operates to sever a pin. The stroke of the reciprocating clamp 92 is of controlled length corresponding to the length of the pins to be cut from the stock. The clamps 91 and 92 and the shear 93 may all be supported from a base 94 and operated by a common, continuously rotating drive shaft 95 extending along the rear of the base.

Figure 10:
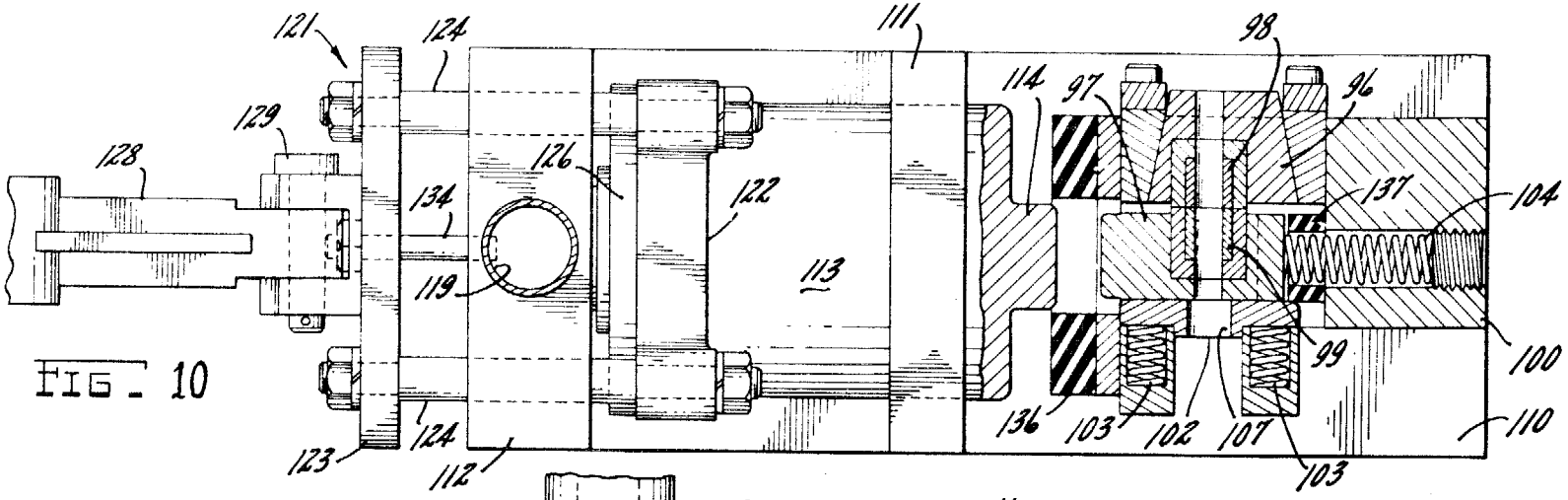
FIG. 10 is a horizontal section on the line 10—10 of FIG. 8.

The particular shear shown in the drawing comprises a stationary shear-member 96 and a horizontally reciprocating shear member 97, respectively carrying abutting bushings 98 and 99 of hard material which receive the stock and perform the shearing operation. Both of the shear members are mounted in a block 100 supported in fixed position from the base 94. As shown, the movable shear member 97 is received between upper and lower wear shoes 101 (FIG. 8) in the block 100 and is acted on by a third shoe 102 urged by springs 103 in a direction to maintain the adjacent ends of the bushings 98 and 99 in abutting relationship, as indicated in FIG. 10. A compression spring 104 acts on the movable block 97 to urge it toward a position, determined by engagement of a flange 105 on the block with the shoes 101, in which the openings in the bushings 98 and 99 are in alignment wth each other to permit the stock 90 to enter the bushing 99 during the feeding stroke of the clamp 92.

Figure 7:
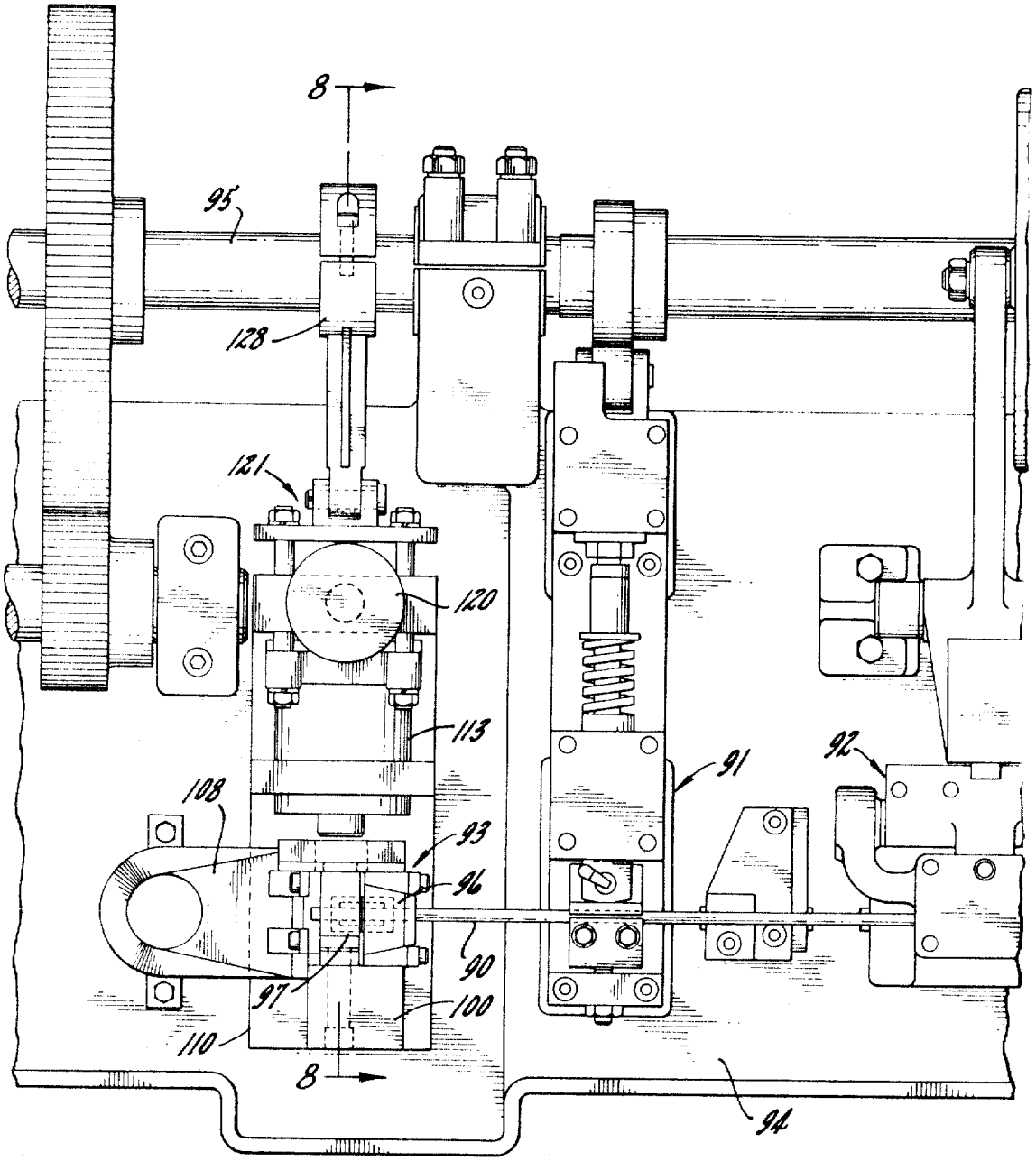
FIG. 7 is a fragmental plan view of another machine which embodies the invention and is adapted to cut pieces of predetermined length from a continuous rod or wire.

After completion of the feeding stroke of the clamp 92 and closing of the clamp 91, forward movement of the shear member 97 will cause a pin to be sheared from the stock 90, the sheared pin remaining in the member 97 until forced therefrom by the stock 90 in its next advance. Sheared pins pass through a hole 107 in the shoe 102 and fall into a drop chute 108 (FIG. 7).

As in the machine shown in FIGS. 1–6, the movable cutting element, in this case the movable block 97, is forced through its operating stroke as a result of being struck by a ram driven by a body of gas maintained under elevated pressure. The machine of FIGS. 7–11, however, differs from that of FIGS. 1–6 in that the cylinder, which, in part contains the body of pressurized gas, is formed in the reciprocating ram, while the associated piston is mounted in stationary position. Other differences between the two machines reside in the means employed to retract and release the ram and in the use of the spring 104 to retract the movable cutting element.

In the arrangement shown in FIGS. 7–11, the shear 93 is mounted on a plate 110 provided, in rear of the shear, with spaced, upwardly extending front and rear posts 111 and 112. The front post slidably receives the ram 113, which is provided at its front end with a centrally located boss 114 adapted to engage the movable shear member 97. At its rear end, the ram 113 is provided with a centrally located cylindrical recess 116 constituting a cylinder which receives a piston 117 mounted in fixed position on and projecting forwardly from the rear post 112. An axial passage 118 extending through the piston 117 connects the cylinder 116 with a passage 119 extending upwardly through the rear post 112 and communicating at its upper end with an accumulator 120. A supply of gas under pressure is maintained in the accumulator 120 and cylinder 116, as by the means employed for the purpose in the machine of FIGS. 1–6. The passages 118 and 119 should have as large a cross-sectional area as practicable in order to avoid throttling of gas displaced between the cylinder 116 and the [accumualtor] *accumulator* 120.

For the purpose of retracting the ram 113 against the force exerted on it by the pressurized gas in the cylinder 116, we employ a reciprocable yoke 121 comprising a front member 122 and a rear member 123 rigidly interconnected by shouldered bolts 124 slidably received in the rear post 112. The ram 113 is loosely received in the front yoke member 122, whose rearward movement relative to the ram is limited by its engagement with an abutment in the form of an annular flange 126 provided at the rear end of the ram. There is thus provided between the yoke and the ram a lost-motion connection by means of which the ram may be retracted in rearward movement of the yoke and temporarily retained in retracted position while the yoke moves forwardly.

The yoke is reciprocated in timed relation with the stock-feeding mechanism by means of an eccentric 127 carried by the drive shaft 95, such eccentric being received in the rear end of a connecting rod 128 whose front end is pivotally connected to the rear yoke-plate 123, as by a pin 129. To retain the ram in retracted position until the moment it is to be released to drive the movable shear member 97 through its cutting stroke, we provide a latch 131 pivotally mounted in the rear post 112 and adapted to engage the ram-flange 126 and retain the ram in retracted position until the latch is released. A spring 132 resiliently urges the latch toward engagement. For the purpose of releasing the latch, it is provided with an upwardly projecting tail 133 located in the path of movement of a pin 134 projecting forwardly from the rear yoke-plate 123.

Figure 11:
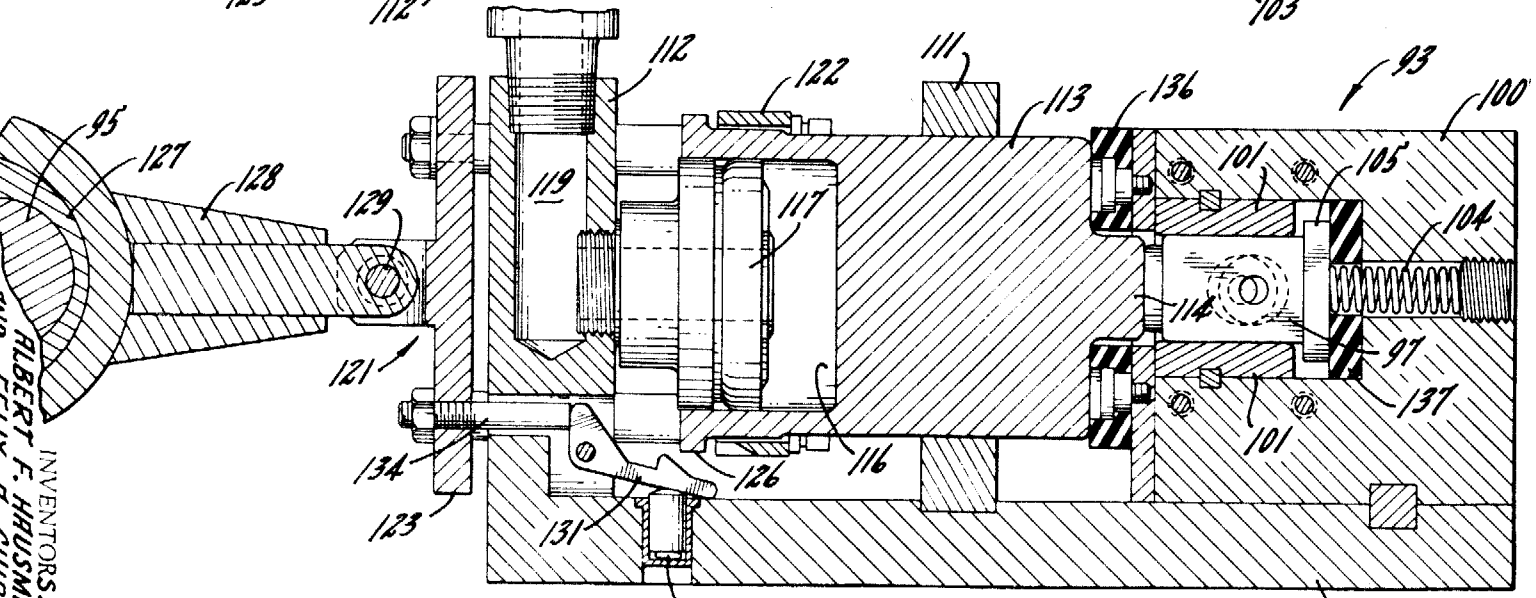
FIG. 11 is a view similar to FIG. 8 showing the positions of the ram and cutting tool at the termination of their working strokes.

In FIG. 11, the parts of the shearing mechanism are shown in the positions they occupy at the completion of a shearing operation. The yoke 121 is at the forward limit of its movement, as is also the ram 113, which has struck the movable shear member 97 and driven it forwardly to shear the stock and compress the spring 104. It will be noted from FIG. 11 that in the position of the parts there shown the front yoke plate 122 is spaced forwardly from the ram-flange 126 to prevent it from interfering with the forward movement of the ram 113 under the influence of pressure in the cylinder 116. In the rotation of the drive shaft, the yoke 121 is moved rearwardly, bringing the front yoke plate into engagement with the ram flange 126, retracting the ram, and permitting the spring 104 to restore the movable shear-member 97 to its normal position (FIG. 10) in which the bushings 98 and 99 are aligned. As the ram nears or reaches the limit of its retracting movement, the ram-flange 126 clears the latch 131, which is then moved upwardly by the spring 132 into engaging position in front of the ram flange. As a result, when the yoke moves forwardly during continuing rotation of the drive shaft 95, the ram does not follow it but is retained in retracted position by the latch. As the yoke nears the forward end of its movement, the pin 134 on it strikes the latch-tail 133 and releases the latch, thereby permitting the ram to move forwardly under the accelerating influence of the pressurized gas in the cylinder 116, strike the movable shear-member 97 and drive it through its cutting stroke. Forward movement of the ram is limited by a pad 136 of rubber or like resilient material secured to the rear face of the block 100, while a similar pad 137 mounted in the block 100 limits forward movement of the shear-member 97.

Since the shearing mechanism and the stock-feeding mechanism are both driven by the common drive shaft 95, they will operate in timed relation to each other. Feeding movement of the stock 90 occurs after retraction of the ram has begun and the spring 104 has brought the cutting bushings 98 and 99 into alignment.

As in the case of the link-plate punching machine of FIGS. 1–6, the pin shearing machine of FIGS. 7–11 is a true shearing machine in which the stock is stressed in shear to the point of fracture by dies which move in a direction to pass each other with a close clearance. The pin shearing machine, like the punching machine, produces materially better results than are obtained on conventional shearing presses. Conventional machines tend to produce pin ends which are deformed by plastic deformation and which have an objectionable rounded corner or radius where the shearing cut began that merges into a crescent-shaped cut band where the tool has penetrated the cross-section before fracture occurred, and on which the major portion of the end face is an oblique fracture surface. While conventional shearing has been used on small sized pins of hard material; if otherwise-acceptable lower-cost material is used, conventionally sheared pin ends are neither flat nor square, and require secondary finishing operations, as in a coining press, if the pins produced are to be used in an assembly such as power transmission chain where pin end shape and finish is of importance. Our new high velocity shearing produces pin ends which have little or no corner radius, have a narrower cut band than conventional sheared pins, and have a substantially flat and smooth fracture surface which is substantially square with the pin surface. The ends are of such good quality and trueness that secondary operations may be eliminated without lowering quality standards. Moreover, the high velocity shearing will produce pin blanks which meet high quality standards without requiring secondary end-finishing operations, in sizes which it was not possible to produce to the same standards by conventional shearing, and which required more expensive sawing or screw-machine operations. To cut such larger-size pins, we have used substantially higher velocities.

As in the case of the machine of FIGS. 1–6, the proportions of a shearing machine such as that of FIGS. 7–11 will depend upon the effort required to perform the shearing operation. A machine which has been employed to shear 0.2 inch carbon-steel rod having a tensile strength in the neighborhood of 150,000 p.s.i. had the following specifications:

| | | |
|---|---|---|
| Weight of ram | lbs | 16 |
| Weight of moving shear parts | lbs | 1.5 |
| Cylinder diameter | inches | 3.5 |
| Ram travel to impact | inch | ⅝ |
| Pressure in cylinder-accumulator | p.s.i. | 42 |
| Volume of cylinder-accumulator (approx.) | cu. in. | 115 |
| Stroke frequency | per min. | 200 |

In this case, the ram attained a velocity of 10 feet per second before impact.

For shearing larger rod, up to .566" diameter steel rod, we have used a ram weighing 8 pounds, a movable die weighing 0.8 pound, and a ram velocity at impact of approximately 50 feet per second.

For such larger diameter rod, a production machine in accordance with the invention may utilize the following representative values:

| | | |
|---|---|---|
| Pin size | in. | 9/16 |
| Shear strength of pins | lb./sq. in. | 85,000 |
| Ram weight | lbs. | 5.3 |
| Movable die weight | lbs. | 2.8 |
| Velocity imparted to die | ft./sec. | 49.2 |
| Ram energy before impact | ft. lbs. | 198 |
| Energy imparted to die | ft. lbs. | 105 |
| Energy required to shear pin | ft. lbs. | 102 |
| Excess die energy | ft. lbs. | 3 |
| Excess ram energy | ft. lbs. | 18.5 |

We claim as our invention:

1. In a shearing machine, having a stationary shearing element and a movable shearing element movable relative to the stationary element to perform a cutting operation by stressing in shear to the point of fracture a workpiece placed between them, a reciprocable ram movable over a predetermined path into and out of engagement with the movable shearing element, means constantly urging said ram toward engagement with the movable shearing element, said means comprising a cylinder and piston one of which is movable with the ram, a rotatable shaft, means including a cam carried by said shaft and operable in rotation thereof to move the ram to a retracted position spaced from said movable shearing element and then to release it to permit fluid-pressure in said cylinder to force the ram toward engagement with said movable shearing element, means for maintaining fluid pressure in said cylinder sufficient to accelerate the ram to a velocity such that, upon striking the moving shearing element following its release, it will cause the movable shearing element to perform the shearing operation, means independent of said cam for limiting movement of the ram after it has struck the movable shearing element, and means operated in timed relation with said shaft for moving said movable shearing element to its retracted position while the cam is moving the ram to its retracted position.

2. A machine as set forth in claim 1 with the addition of releasable means for holding the ram in retracted position.

3. A machine as set forth in claim 1 further characterized in that the volume of said cylinder is many times the displacement of said piston.

4. A machine as set forth in claim 1 with the addition of means operated in timed relation with said shaft for feeding work into position to be operated on by said shearing elements and means for interrupting operation of said feeding means while said shaft continues to rotate.

5. A machine as set forth in claim 1 with the addition of means operated in timed relation with said shaft for feeding work into position to be operated on by said shearing elements.

6. A machine as set forth in claim 1 with the addition of means operated in timed relation with said shaft for feeding work into position to be operated on by said shearing elements and means operable to simultaneously retain the ram in retracted position and interrupt operation of said feeding means.

7. A machine as set forth in claim 1 with the addition that said ram includes an impact member engageable with the movable shearing element and adjustable in the ram in a direction parallel to the path of ram movement.

8. A machine as set forth in claim 1 in which the cam has a progressive cam rise terminating in an abrupt drop off and the ram is retracted by such rise and is released by the cam drop off.

9. A machine as set forth in claim 1, in which the cam has a progressive cam rise to retract the cam and acts thereon through a lost motion connection, with the addition of a latch to retain the ram in retracted position, and means to unlatch the latch to release the ram when the cam has moved to a position providing lost motion in its connection to the ram.

10. A machine as set forth in claim 9 in which the latch is released in response to movement of the cam to said lost-motion-providing position.

11. In a shearing machine having a stationary shearing element and a movable shearing element movably in passing relation to the stationary element to perform a cutting operation by stressing in shear to the point of fracture a work-piece placed between them, a reciprocable ram movable over a predetermined path into and out of engagement with said movable shearing element, means constantly urging said ram toward engagement with said movable shearing element, power-operated means for moving the ram against the effort exerted on it by said ram-urging means to a retracted position spaced from said movable shearing element and then releasing it to permit said ram-urging means to force the ram toward engagement with the movable shearing element, said ram urging means exerting on the ram a force sufficient to impart to the ram before it engages the movable shearing element a kinetic energy at least equal to that required both to accelerate the movable shearing element to a velocity of at least 6 to 8 feet per second and to cause the movable shearing element to perform the cutting operation and means for retracting the movable shearing element after the cutting operation.

12. In a shearing machine as set forth in claim 11 in which said means for retracting the movable shearing element is power-operated in timed relation with said ram-retracting means.

13. In a shearing machine as set forth in claim 11 in which said means for retracting the movable shearing element is a spring means.

14. A shearing machine as set forth in claim 11, with the addition of means independent of the movable shearing element for limiting movement of the ram after it has struck said element.

15. A shearing machine as set forth in claim 14 with the addition of means independent of the work for limiting movement of the movable shearing element after it has performed the cutting operation.

16. A shearing machine as set forth in claim 11 with the addition of hold-down means for holding the work-piece against the stationary shearing element during the cutting operation.

17. In a shearing machine as set forth in claim 11 in which the ram is accelerated to a velocity to impart to the movable shearing element a velocity of at least 10 to 12 feet per second.

18. A shearing machine as set forth in claim 11 with the addition of releasable means for retaining the ram in retracted position.

19. A shearing machine as set forth in claim 11 with the addition of means operable in timed relation with said power-operated means for feeding work into position to be sheared by the shearing elements, and means for interrupting operation of said feeding means while said power-operated means continues in operation.

20. A shearing machine as set forth in claim 11 with the addition of means operable in timed relation with said power-operated means for feeding work into position to be sheared by the shearing elements.

21. A shearing machine as set forth in claim 11 with the addition of means for varying the extent to which the movable shearing element is moved while engaged by the ram, said means including a stationary member engageable by the ram after it has struck the movable shearing element.

22. A shearing machine as set forth in claim 11 in which said ram-urging means comprises stressed resilient means which maintains a high ram-accelerating force on the ram throughout the forward movement of the ram.

23. In a shearing machine, having a stationary shearing element and a movable shearing element movable relative to the stationary element to perform a cutting operation by stressing in shear to the point of fracture a work-piece placed between them, a reciprocable ram movable over a predetermined path into and out of engagement with the movable shearing element, means constantly urging said ram toward engagement with the movable cutting element, said means comprising a cylinder and piston one of which is movable with the ram, means to move the ram to a retracted position spaced from said movable shearing element and then to release it to permit fluid-pressure in said cylinder to force the ram toward engagement with said movable cutting member, means to maintain fluid pressure in said cylinder sufficient to accelerate the ram to a velocity to impart to the moving shearing member, upon striking the same following its release, a velocity of at least 6 to 8 feet per second to cause the movable shearing element to perform the cutting operation, and means operating in timed relation with said ram-retracting means for moving said movable shearing member to a retracted position while said means is moving the ram to its retracted position.

24. In a shearing machine, having a stationary shearing element and a movable shearing element movable relative to the stationary element to perform a cutting operation by stressing in shear to the point of fracture a work-piece placed between them, a reciprocable ram movable over a predetermined path into and out of engagement with the movable shearing element, resilient means constantly urging said ram toward engagement with the movable shearing element, a rotatable shaft, means including a cam carried by said shaft and operable in rotation thereof to move the ram to a retracted position spaced from said movable shearing element and then to release it to permit said resilient means to force the ram toward engagement with said movable cutting member, said resilient means being stressed to maintain a force on said ram sufficient to impart to it before it engages the movable shearing element a kinetic energy at least equal to that required both to accelerate the movable shearing element to a velocity of at least 6 to 8 feet per second and to cause the movable shearing element to perform the shearing operation, means independent of said cam for limiting movement of the ram after it has struck the movable shearing member, and means operating in timed relation with said shaft for moving said movable shearing member to its retracted position while the cam [its] *is* moving the ram to its retracted position.

25. In a shearing machine, having a stationary shearing element and a movable shearing element movable relative to the stationary element to perform a cutting operation by stressing in shear to the point of fracture a work-piece placed between them, a reciprocable ram for driving the movable shearing element through the shearing operation, resilient means urging said ram in a shear actuating forward direction, power-operated means for moving the ram against the effort exerted on it by said resilient means to a retracted position and then releasing it to permit the resilient means to force the ram forward to drive the movable shearing element through a shearing operation, said resilient means exerting on the ram a ram-accelerating force sufficient to impart to the ram before the shearing operation begins a kinetic energy sufficient to cause the movable shearing element to perform the shearing operation at an initial velocity of at least 6 to 8 feet per second, and means for retracting the movable shearing element to a work-piece clearing position while the ram is moved to its retracted position.

26. A shearing machine as set forth in claim 25 in which said resilient means comprises an expansible gas chamber in which the gas pressure acts to urge the ram forward, and means to maintain said chamber under elevated pressure to exert continuous ram-urging force.

27. The method of producing an improved sheared face on a work-piece which is cut by stressing the same in shear to the point of fracture between a stationary shearing element and a movable shearing element confined to move in passing relation with the stationary shearing element, which comprises [applying to] *impacting against* the movable shearing element, in the direction of movement thereof, [an accelerating force adapted] *an impact member having sufficient mass and velocity* to impart to the movable die element as it starts the shearing operation a velocity of at least 6 to 8 feet per second and more than sufficient kinetic energy to shear the material being acted on by the shearing elements.

28. The method of producing an improved sheared face on a work-piece which [in] *is* cut by stressing the same in shear to the point of fracture between a stationary shearing element and a movable shearing element confined to move in passing relation with the stationary shearing element, which comprises driving *against the movable shearing element an impact member having sufficient mass and velocity to drive* the movable shearing element through its shearing movement at an initial velocity of at least 6 to 8 feet per second.

29. In a shearing machine having a stationary shearing element and a movable shearing element movable from a retracted position past said stationary element in a forward direction to perform a cutting operation by stressing in shear to the point of fracture a work-piece placed between the shearing elements, a reciprocable ram movable in a forward direction from a retracted position to force said movable element through a shearing operation, resilient means acting forwardly on said ram with a force equal to at least several times the combined weights of said ram and movable shearing element, said retracted position of the ram being spaced far enough from the stationary shearing element that such force accelerates the ram to a velocity of at least 6 to 8 feet per second before the movable shearing element begins its cutting operation, and power-operated means for restoring the ram and movable shearing element to retracted position after completion of a shearing operation.

*30. In a shearing machine, having a stationary shearing element and a movable shearing element mounted for movement in shearing relation to the stationary element to perform a cutting operation by stressing in shear to the point of fracture a work-piece placed between them, a reciprocable ram movable over a predetermined path into and out of engagement with the movable shearing element, means for driving said ram toward engagement with the movable cutting element, said means comprising a cylinder and piston one of which is movable with the ram, means to move the ram to a retracted position spaced from said movable shearing element, means to supply fluid pressure in said cylinder sufficent to accelerate the ram from its retracted position to a velocity to impart to the moving shearing member, upon striking the same, a velocity of at least 6 to 8 feet per second to cause the movable shearing element to perform the cutting operation, and means for moving said movable shearing member to a work-receiving position when the ram is retracted.*

*31. A shearing machine having a stationary shearing element and a movable shearing element movable relative to the stationary element to perform a cutting operation by stressing in shear to the point of fracture a work-piece placed between them, and comprising a ram having a retracted position spaced from the movable shearing element and movable forwardly therefrom through an operating stroke into engagement with the movable shearing element to drive the same through a shearing operation, means for applying to the ram a forwardly accelerating force to drive the ram through such forward movement, the amount of ram-accelerating force and the length of ram movement during which the ram-accelerating force is applied being sufficient to impart to the ram by the time it engages the movable shearing element a kinetic energy at least equal to that required both to accelerate the movable shearing element to a velocity of at least 6 to 8 feet per second and to cause the movable shearing element ot perform the shearing operation.*

*32. A shearing machine as set forth in claim 31 in which the movable shearing element is positioned substantially in engagement with the work piece at the time it is engaged by the ram.*

*33. A shearing machine as set forth in claim 31 in which the ram-accelerating means comprises a piston and cylinder, one of which is movable with the ram, and means to supply fluid pressure to said cylinder in sufficient amount over sufficient length of ram movement to create the required kinetic energy.*

*34. A shearing machine as set forth in claim 33 with the addition of means operating in cyclic timed sequence to restore the ram to retracted position, to feed work piece stock to the shearing elements, and to effect a ram operating stroke.*

*35. A shearing machine as set forth in claim 33 in which ram accelerating fluid pressure is maintained in said piston and cylinder to continuously urge said ram toward said movable shearing element, with the addition of power-operated means to move the ram to retracted position against the force of such fluid pressure.*

*36. The method of producing an improved sheared face on a work-piece which is cut by stressing the same in shear to the point of fracture between a stationary shearing element and a movable element confined to move in passing relation with the stationary shearing element, which comprises driving against the movable shearing element an impact member having substantially greater mass than the movable shearing element, at an impact velocity exceeding 6 to 8 feet per second, and thereby imparting to the movable shearing element more than sufficient energy to shear the material being acted on by the shearing elements.*

References Cited

The following references, cited by the Examiner, are of record in the patented file of this patent or the original patent.

UNITED STATES PATENTS

| | | | |
|---|---|---|---|
| 655,267 | 8/1900 | Obermeyer | 83—628X |
| 2,276,259 | 3/1942 | Temple | 83—639X |
| 2,302,646 | 11/1942 | Temple | 83—639X |
| 2,495,953 | 1/1950 | Austin | 83—639X |
| 2,602,507 | 7/1952 | Adams | 83—587 |
| 2,708,970 | 5/1955 | Taylor | 83—590X |
| 2,185,303 | 1/1940 | Kinley | 166—54.6 |
| 1,859,372 | 5/1932 | Mutschler | 83—423X |
| 2,039,840 | 5/1936 | Howland-Shearman | 225—93X |
| 2,850,093 | 9/1958 | D'Angelo et al. | 83—586 |
| 2,956,464 | 10/1960 | Charron | 83—257 |

FOREIGN PATENTS

| | | |
|---|---|---|
| 279,229 | 10/1927 | Great Britain. |

JAMES M. MEISTER, Primary Examiner

U.S. Cl. X.R.

83—587, 639 225—103